3,247,273
DEHYDROGENATION PROCESS

Russell M. Mantell and Laimonis Bajars, Princeton, N.J., assignors to Petro-Tex Chemical Corporation, Houston, Tex., a corporation of Delaware
No Drawing. Filed May 22, 1962, Ser. No. 196,610
7 Claims. (Cl. 260—669)

This is a continuation-in-part application of our copending application Serial No. 18,828, filed March 31, 1960, now abandoned.

This invention relates to an improved process for preparing alkenyl aromatic compounds from alkyl aromatic compounds, and relates more particularly to an improved process for dehydrogenating certain alkyl aromatic compounds in the presence of oxygen and halogen to provide the corresponding alkenyl aromatic compounds.

The dehydrogenation of alkyl aromatic compounds such as ethylbenzene and isopropylbenzene to styrene and α-methyl styrene is accomplished commercially by passing ethylbenzene or isopropylbenzene at high temperatures over certain metal oxide catalysts. One of the major catalysts for this use is known as the 1707 catalyst which contains a major proportion of magnesia, iron oxide and small amounts of copper oxide and an alkaline compound of potassium. When ethylbenzene is passed over such catalysts, the conversion to styrene is at the rate of about 35 to 40 percent per pass. While these yields are commercial, it has been a continuing object of those skilled in the art to provide processes with higher yields of styrene per pass.

U.S. Patent 2,719,171 discloses preparation of styrene from ethylbenzene in the presence of oxygen and iodine and an inert contact mass at yields of 39.9 percent. A yield of only 40 percent is of no economic interest since iodine is an expensive material and in view or the attendant corrosion and recovery problems, particularly since the yields obtained are of the same magnitude as the yields obtained in presently used commercial processes.

It has now been discovered, quite unexpectedly, that greatly improved yields of alkenyl aromatic compounds including styrene and alkyl styrenes, as high as 90 percent per pass, are obtained by dehydrogenating alkyl benzenes in the vapor phase at elevated temperatures in admixture with oxygen and certain halogens when the partial pressure of the alkyl benzene being dehydrogenated is less than one-fourth of the total pressure, and these excellent yields are obtained even in the presence of metals or compounds thereof which are not inert to halogens.

In a typical embodiment of the invention, a mixture of ethylbenzene, oxygen and iodine in a ratio of one mol of ethylbenzene, 0.8 mol of oxygen and 0.03 mol of iodine and ten mols of steam, per mol of ethylbenzene, is passed through a rector at a temperature of 560° C. at a space velocity of 1073 gaseous v./v./hour. A conversion of ethylbenzene to styrene of 96 percent and a yield of 89.7 percent styrene is obtained in one pass. The hydrogen iodide by-product is readily separated from the styrene which is thereafter purified by fractionation. When this process is conducted with the ethylbenzene at a partial pressure of about 15 inches of mercury or greater, the yield of styrene in one pass obtained is only about 40 percent. Not only is the unexpectedly high conversion and yield of styrene produced in accordance with the novel process of this invention of economic advantage for the most efficient ultilization of feedstock as compared to prior are processes, but recycling is not required to obtain high yields of product, and straightforward and efficient purification of the desired styrene is readily accomplished, because of the high yield of styrene and the low concentration of impurities which have to be removed.

While the total pressure on systems employing the process of this invention may be sub-atmospheric, atmospheric or superatmospheric, the partial pressure of the alkyl aromatic compound must be maintained throughout the reaction at less than one-third of the total pressure and this is a necessary and critical feature of the invention. The partial pressure of the alkyl aromatic compound initially and thereafter should be equivalent to less than 7.5 inches mercury absolute when the total pressure is one atmosphere (about ¼ of the total) to realize the advantages of this invention, and better results are normally obtained when the partial pressure of the alkyl aromatic compound is equivalent to less than about 5 inches of mercury absolute. A useful range is equivalent to between about 0.1 and 5 inches of mercury absolute. Since the initial partial pressure of the alkyl aromatic compound to be dehydrogenated is equivalent to less than 7.5 inches mercury at a total pressure of one atmosphere, the combined partial pressure of the alkyl aromatic compound and resulting alkenyl aromatic compound will be equivalent to less than 7.5 inches mercury. During the dehydrogenation reaction, at no time will the combined partial pressure of, for example, ethylbenzene and styrene be greater than equivalent to about one-fourth atmosphere at a total pressure of one atmosphere. Further, the combined partial pressure of the aromatic compounds and the halogen-liberating material will also be equivalent to less than one-fourth atmosphere at one atmosphere. When pressures above one atmosphere are employed, the values for alkyl aromatic partial pressure cited above will be altered in direct proportion to the increase above atmospheric pressure. While the desired partial pressure may be obtained and maintained by techniques known to those skilled in the art including vacuum operations, dilution with helium, nitrogen and inert gases, steam is particularly advantageous, and it is surprising that the desired reaction to high yield of styrene is effective in the presence of large amounts of steam. Further, the reaction is readily controlled through the use of steam. The ratio of steam to alkyl aromatic compound will be normally within the range of about 5 to 30 mols of steam per mol of alkyl aromatic compound. When air is employed as the source of oxygen, less steam normally will be required. The degree of dilution of the reactants with steam and the like is related to the necessity of keeping the partial pressure of the alkyl aromatic compound in the system below 6 inches mercury absolute at one atmosphere pressure in order to obtain the desired optimum yield per pass of styrene. A more preferred steam dilution is between about 5 to about 12.5 mols per mol of alkyl aromatic compound to be dehydrogenated.

The amount of oxygen used will be from above one-fourth mol of oxygen per mol of alkyl aromatic compound to about two to three mols or more of oxygen per mol of alkyl aromatic compound. Better results are obtained with from about 0.5 to 1.75 mols of oxygen per mol of alkyl aromatic compound. Excellent yields of styrene are obtained with about 0.6 to about 1.5 mols of oxygen per mol of ethylbenzene. Oxygen is supplied to the system as pure oxygen or diluted with inert gases such as helium, carbon dioxide and the like. In relation to the halogen the amount of oxygen employed must be greater than 1.25 mols of oxygen per atom of iodine, and more preferably, greater than 2.5 mols of oxygen per atom of iodine.

Iodine employed in the process of this invention may be iodine itself, hydrogen iodide, organic iodides or any iodine-containing compound which decomposes under the reaction conditions defined herein to provide free iodine or hydrogen iodide. Useful organic iodine compounds include alkyl iodides such as methyl iodide, ethyl iodide, butyl iodide, hexyl iodide, octyl iodide, iodoform and the like. Although secondary and tertiary alkyl iodides, aromatic and heterocyclic iodides are contemplated for use in this invention, preferred are lower alkyl iodides. Much preferred from an economic basis, ease of handling and better all-around performance is hydrogen iodide which may be recycled without any further treatment. It should be understood that when iodine is referred to herein, that free iodine under the conditions of reaction is understood, regardless of the initial source of the iodine. Although iodine and its compounds are preferred, bromine and chlorine and compounds thereof corresponding to the iodine compounds listed above may be substituted in whole or in part for iodine to obtain alkenyl aromatic compounds.

Under the defined reaction conditions, the iodine concentration normally will be between above 0.02 up to 0.10 mol of halogen per mol of alkyl aromatic compound. Excellent yields of styrene under the process conditions of this invention are obtained when the iodine concentration is between about 0.025 to 0.090 mol of iodine per mol of alkyl aromatic compound. Amounts of halogen as high as about 0.5 mol of iodine per mol of alkyl aromatic compound may be employed, but these larger amounts are normally not necessary in order to obtain the desired high yield of alkenyl aromatic compound and less than 0.2 mol of iodine, normally amounts from about 0.25 to 0.075 mol per mol of alkyl aromatic compound will be found to be satisfactory.

The reaction is exothermic and the temperature at which the reaction is conducted may be between 400° C. to as high as 800° C., and usually is between about 450° C. and 700° C. Excellent results are obtained within the range of above 450° C. to about 550° C. An advantage of this invention is the latitude of reaction temperatures although better results are normally obtained at temperatures below 650° C.

The flow rates of the reactants may be varied quite widely, and in terms of liquid alkyl aromatic compounds may be between 0.1 to 10 liquid v./v./hr. Good results have been obtained at space velocities in the range of about 500 to 2,000 gaseous v./v./hour; that is, volumes of gaseous reaction mixture at standard temperature and pressure per volume of reaction zone per hour, and more preferred, space velocities in the range of about 800 to 1200 v./v./hour.

The manner of mixing the iodine or its compounds, alkyl aromatic compound, oxygen and steam, if used, is subject to some choice by those skilled in the art. In normal operations the alkyl aromatic compound may be preheated and mixed with steam and preheated oxygen or air, and iodine are mixed therewith prior to passing the stream in vapor phase through the reactor. Hydrogen iodide may be dissolved in water and may be mixed with the steam or air prior to the reaction. Iodine may be dissolved in a solvent and mixed with the steam or air prior to reaction. The effluent reaction product from the reactor is cooled and is passed to means for removing hydrogen halide which normally will represent most of the halogen present during the course of the reaction and the alkenyl aromatic product is then suitably purified as by fractionation to obtain the desired high purity alkenyl aromatic compound.

This invention is readily applied to obtain high yields of alkenyl aromatics, including vinyl toluene, α-methyl styrene, the chlorostyrenes, divinylbenzene, vinylnaphthalene, and the like. Therefore, in accordance with this invention, ethylbenzene, isopropyl benzene, the methylethylbenzenes, the chloroethylbenzenes as p-chloroethylbenzene, 2,3-dichloroethylbenzene, the equivalent bromine compounds, diethylbenzene, ethylnaphthalene, triethylbenzene, 1-phenyl propane, 1,1-diphenylethane, p-menthane, p-cymene, and the like, are useful in the process of this invention to provide the equivalent alkenyl aromatic compounds. In general, any of the alkyl aromatics which have been dehydrogenated by those skilled in the art to form the equivalent alkenyl aromatic compounds may be used in the process of this invention. When used in the specification and claims hereafter, the term "styrene" is meant to include the various styrenes listed above, which may be represented by the general formula:

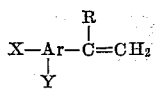

wherein Ar is phenyl or naphthyl, R is hydrogen or methyl, and X and Y are hydrogen, methyl, ethyl, propyl, butyl, halogen, NO$_2$, SO$_3$H, phenoxy or alboxy, and the like.

A variety of reactor types may be employed. For example, tubular reactors of small diameter made of quartz, porcelain, stainless steel or other metals or alloys of the metals described above as catalysts for the reaction may be employed. Large diameter reactors will require loading to provide the required surface for efficient operation. Fixed bed reactors containing metals or metal compounds as described above in the form of grids, screens, pellets, or supports and the like may also be used. The catalyst surface exposed normally will be greater than ten square feet, preferably greater than about forty square feet per cubic foot of reactor. In any of these reactors suitable means for heat removal should be provided. Fluid and moving bed systems are readily applied to the processes of this invention. Ceramic and porcelain packing materials have been found to be effective.

In the following examples will be found specific embodiments of the invention and details employed in the practice of the invention. These examples are intended as illustrative only, since numerous modifications and variations in accordance with the disclosure herein will be apparent to those skilled in the art.

*Example 1*

A 5/16 inch O.D. coiled, quartz tubular reactor was heated with a furnace to 560° C. Ethylbenzene, oxygen and iodine in a molar ratio of 0.8 mol of oxygen and 0.03 mol of molecular iodine per mol of ethylbenzene and ten mols of steam per mol of ethylbenzene were passed through the quartz reactor at a gas space velocity of 1073 v./v./hour. The conversion of ethylbenzene during the run was 91.4 percent with a yield of 88.2 percent styrene.

*Example 2*

The tubular quartz reactor of Example 1 was replaced with a 304[1] type stainless steel 5/16 inch tubing and the reaction was conducted at 500° C. with the same molar ratio of reactants as in Example 1. The conversion of ethylbenzene was 91.7 percent and the yield of styrene was 90 percent.

When the above examples are repeated with isopropyl benzene, good yields of α-methyl styrene are obtained. Likewise, when hydrogen iodide and 1-iodo-3-methyl butane are used in place of iodine, similar high yields of styrene per pass are obtained.

*Example 3*

Example 2 was repeated with the exceptions that the space velocity was 621 and the molar ratio of steam to ethylbenzene was 5.0 to 1.0. The percent hydrocarbon recovered was 80.5 percent, the percent conversion was 94.8 percent to give an ultimate yield of 76.3 percent styrene.

*Examples 4 through 10*

In the following examples the same stainless steel reactor was used as in Example 2 at the conditions set forth below. The feed was ethylbenzene (listed in the table as "EB"). The source of the oxygen was air and

---

[1] A.I.S.I. type 304 stainless steel tubing which contained about 10 percent nickel, 18 percent chromium, 68 percent iron, plus traces of silica, phosphorous, and manganese.

the amount of oxygen is calculated as mols of $O_2$. The flow rates were one-half liquid volumes of ethylbenzene per volume of reactor per hour. The mol ratio of ethylbenzene to iodine was 1.0 to 0.03 in each run. The mol ratio of steam to ethylbenzene was 10 to 1.0 in each run. The iodine used was elemental iodine.

| Example | Reactor Temp., °C. | $O_2$/EB Mole Ratio | Hydrocarbon Recovered, Percent | Conversion, Percent | Ultimate Styrene Yield, Percent |
|---|---|---|---|---|---|
| 4 | 485 | 1.0/1.0 | 91.4 | 92.0 | 84.0 |
| 5 | 525 | 1.0/1.0 | 82.6 | 100.0 | 82.6 |
| 6 | 500 | 0.75/1.0 | 95.7 | 92.0 | 87.2 |
| 7 | 500 | 0.8/1.0 | 98.7 | 91.0 | 89.7 |
| 8 | 500 | 1.0/1.0 | 87.0 | 97.2 | 84.5 |
| 9 | 500 | 1.2/1.0 | 87.0 | 92.5 | 80.4 |
| 10 | 500 | 1.5/1.0 | 87.0 | 93.3 | 81.0 |

When the runs were made under the conditions of Example 7 above with the exception that the mols of iodine per mol of ethylbenzene were 0.005, 0.001, or 0.00 mols of iodine, very poor yields of styrene were obtained.

When the above examples are repeated with HI or alkyl iodides as 1-iodo-3-methyl butane, similar good yields of styrene are obtained. Improved yields of styrene also are obtained with bromine and hydrogen bromide.

We claim:

1. A method for preparing alkenyl aromatic compounds which comprises heating in the vapor phase at a temperature in the range of above 400° C. to less than about 800° C., an alkyl aromatic compound with oxygen in a molar ratio of about 0.5 to about 1.5 mols of oxygen per mol of alkyl aromatic compound and an iodine-liberating material in amount greater than the equilvalent of 0.02 to 0.075 mol of iodine per mol of alkyl aromatic compound, the partial pressure of alkyl aromatic compound being equivalent to less than one-fifth atmosphere at a total pressure of one atmosphere, the molar ratio of oxygen to iodine being greater than 2.5 mols of oxygen per atom of iodine.

2. A method for preparing styrene and methyl styrenes which comprises heating in the vapor phase at a temperature in the range of above 450° C. to about 750° C. an alkyl aromatic compound selected from the group consisting of ethylbenzene, ethyl toluene and isopropylbenzene with oxygen in a molar ratio of about 0.6 to 1.5 mols of oxygen per mol of said alkyl aromatic compound and iodine in a molar ratio of 0.025 to 0.075 mol of iodine per mol of said alkyl aromatic compound while maintaining the partial pressure of said alkyl aromatic compound at equivalent to less than 6 inches mercury absolute at a total pressure of one atmosphere, the molar ratio of oxygen to iodine being greater than 2.5 mols of oxygen per atom of iodine.

3. A method for preparing styrene which comprises heating ethylbenzene in the vapor phase at a temperature in the range of above 450° C. to about 650° C. with oxygen in a molar ratio of about 0.5 to about 1.5 mols of oxygen per mol of ethylbenzene and iodine in a molar ratio of 0.025 to 0.075 mol of iodine per mole of ethylbenzene, the partial pressure of said ethylbenzene being maintained at equivalent to less than one-sixth atmosphere at a total presure of one atmosphere, the molar ratio of oxygen to iodine being greater than 2.5 mols of oxygen per atom of iodine.

4. A method for preparing vinyl toluene which comprises heating ethyl toluene in the vapor phase at a temperature in the range of about 450° C. to about 650° C. with oxygen in a molar ratio of about 0.6 to about 1.5 mols of oxygen per mol of ethyl toluene and iodine in a molar ratio of 0.025 to 0.075 mol of iodine per mol of ethyl toluene, the partial pressure of said ethyl toluene being maintained equivalent to less than one-sixth atmosphere at a total pressure of one atmosphere, the molar ratio of oxygen to iodine being greater than 2.5 mols of oxygen per atom of iodine.

5. A method for preparing $\alpha$-methyl styrene which comprises heating isopropyl benzene in the vapor phase at a temperature in the range of about 450° C. to about 650° C. with oxygen in a molar ratio of about 0.6 to about 1.5 mols of oxygen per mol of isopropyl benzene and iodine in a molar ratio of 0.025 to 0.075 mol of iodine per mol of isopropyl benzene, the partial pressure of said isopropyl benzene being maintained equivalent to less than one-sixth atmosphere at a total pressure of one atomsphere, the molar ratio of oxygen to iodine being greater than 2.5 mols of oxygen per atom of iodine.

6. A method for preparing alkenyl aromatic compounds which comprises heating in the vapor phase at a temperature in the range of about 400° C. to about 800° C. an alkyl aromatic compound with oxygen in a molar ratio of above 0.5 to about 1.5 mols of oxygen per mol of alkyl aromatic compound and an iodine-liberating material in amount greater than 0.025 to 0.075 mol of iodine per mol of alkyl aromatic compound, and 5 to 30 mols of steam per mol of said alkyl aromatic compounds to provide a partial pressure of said alkyl aromatic compound at equivalent to less than one-fifth atmosphere at a total pressure of one atmosphere, the molar ratio of oxygen to iodine being greater than 2.5 mols of oxygen per atom of iodine.

7. A method for preparing styrene and methyl styrenes which comprises heating in the vapor phase at a temperature in the range of about 450° C. to 650° C. an alkyl aromatic compound selected from the group consisting of ethylbenzene, ethyl toluene and isopropyl benzene with oxygen in a molar ratio of about 0.5 to less than 2 mols of oxygen per mol of said alkyl aromatic compound, iodine in a molar ratio of 0.025 to 0.09 mol of iodine per mol of said alkyl aromatic compound, and about 5 to 15 mols of steam per mol of said alkyl aromatic compound in a stainless steel reactor, the molar ratio of oxygen to iodine being greater than 2.5 mols of oxygen per atom of iodine.

References Cited by the Examiner

UNITED STATES PATENTS

| 2,719,171 | 9/1955 | Kalb | 260—680 |
| 2,880,249 | 3/1959 | Raley et al. | 260—683.3 X |
| 2,890,253 | 6/1959 | Mullineaux et al. | 260—699 X |
| 2,921,101 | 1/1960 | Magovern | 260—669 X |

DELBERT E. GANTZ, *Primary Examiner.*

ALPHONSO D. SULLIVAN, PAUL M. COUGHLAN,
*Examiners.*